(12) United States Patent
Joly et al.

(10) Patent No.: US 11,655,778 B2
(45) Date of Patent: May 23, 2023

(54) MORPHING STRUCTURES FOR FAN INLET VARIABLE VANES

(71) Applicant: Raytheon Technologies Corporation, Farmington, CT (US)

(72) Inventors: Michael M. Joly, Hebron, CT (US); Zaffir A. Chaudhry, South Glastonbury, CT (US); Andrzej Ernest Kuczek, Bristol, CT (US); Om P. Sharma, South Windsor, CT (US); Georgi Kalitzin, West Hartford, CT (US); Simon W. Evans, Farmington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/396,050

(22) Filed: Aug. 6, 2021

(65) Prior Publication Data
US 2023/0044195 A1    Feb. 9, 2023

(51) Int. Cl.
| | |
|---|---|
| *F02C 9/20* | (2006.01) |
| *F02K 3/06* | (2006.01) |
| *F02C 9/22* | (2006.01) |
| *F01D 5/28* | (2006.01) |
| *F02C 9/58* | (2006.01) |
| *F02C 9/54* | (2006.01) |

(52) U.S. Cl.
CPC ............... *F02K 3/06* (2013.01); *F01D 5/28* (2013.01); *F02C 9/20* (2013.01); *F02C 9/22* (2013.01); *F02C 9/54* (2013.01); *F02C 9/58* (2013.01); *F05D 2220/36* (2013.01); *F05D 2240/128* (2013.01)

(58) Field of Classification Search
CPC ............ F02C 9/20; F02C 9/54; F05D 2240/12
See application file for complete search history.

(56) References Cited

U.S. PATENT DOCUMENTS

| | | | |
|---|---|---|---|
| 3,237,918 A | 3/1966 | Le Bell | |
| 3,295,827 A | 1/1967 | Chapman | |
| 5,114,104 A * | 5/1992 | Cincotta | B64C 3/48 244/99.8 |
| 6,182,929 B1 * | 2/2001 | Martin | B63B 39/06 244/99.11 |
| 8,011,882 B2 | 9/2011 | McMillan | |

(Continued)

FOREIGN PATENT DOCUMENTS

| | | | |
|---|---|---|---|
| EP | 3502416 | | 6/2019 |
| EP | 3670849 | | 6/2020 |
| GB | 2210108 | * | 6/1989 |

OTHER PUBLICATIONS

European Search Report for EP Application No. 22185566.1 dated Dec. 8, 2022.

*Primary Examiner* — Gerald L Sung
(74) *Attorney, Agent, or Firm* — Carlson, Gaskey & Olds, P.C.

(57) ABSTRACT

A gas turbine engine includes a fan section, a compressor section, and a turbine section. The fan section has a plurality of vane assemblies spaced circumferentially about an engine axis. The vane assemblies each include an airfoil extending between a leading edge and a trailing edge, a control rod extending through the airfoil, and a mechanism driven by the control rod to change the shape of the airfoil. A vane system for a gas turbine engine is also disclosed.

20 Claims, 6 Drawing Sheets

(56) References Cited

U.S. PATENT DOCUMENTS

| | | | |
|---|---|---|---|
| 10,273,976 B2 | 4/2019 | Jemora et al. | |
| 10,662,803 B2 | 5/2020 | Mears | |
| 11,028,725 B2 | 6/2021 | Chaudhry et al. | |
| 2008/0317587 A1* | 12/2008 | Lord | F01D 5/148 60/226.1 |
| 2009/0269198 A1* | 10/2009 | Grohmann | B64C 27/615 416/23 |
| 2011/0217170 A1* | 9/2011 | Buffone | B64C 11/20 416/128 |
| 2013/0183136 A1* | 7/2013 | Roberge | F01D 19/00 415/208.1 |
| 2014/0219772 A1* | 8/2014 | Nordeen | F01D 17/16 415/1 |
| 2015/0159501 A1 | 6/2015 | Firnhaber | |
| 2015/0361819 A1* | 12/2015 | Epstein | F01D 1/023 415/208.1 |
| 2017/0191427 A1* | 7/2017 | McNeil | F02C 7/36 |
| 2018/0216527 A1* | 8/2018 | D'Angelo | F02C 9/20 |
| 2018/0371938 A1 | 12/2018 | Skertic | |
| 2019/0186501 A1* | 6/2019 | Kalitzin | F01D 5/147 |
| 2020/0088063 A1* | 3/2020 | Dyer | F01D 5/146 |
| 2020/0332673 A1 | 10/2020 | Joly et al. | |
| 2021/0003030 A1 | 1/2021 | Joly et al. | |
| 2021/0131308 A1 | 5/2021 | Chaudhry et al. | |

\* cited by examiner

MORPHING STRUCTURES FOR FAN INLET VARIABLE VANES

BACKGROUND OF THE INVENTION

This application relates to a gas turbine engine with fan inlet variable vanes that may morph in shape.

Gas turbine engines typically include a fan section, a compressor section, a combustor section, and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor section and the fan section. The compressor section may include low and high pressure compressors, and the turbine section may also include low and high pressure turbines.

Fan inlet variable vanes may be included in the fan section upstream of the fan. The vanes turn air in a desired direction as it approaches the fan. However, the desired direction may change depending on the operating condition of the engine. As such, it is known to provide variable vanes. Variable vanes are typically provided with an actuator which deflects a flap on the trailing edge of the vanes such that the trailing edges change an incident angle relative to the angle of the fan blades depending on operating condition.

In general, the vanes have changed the fan blade incident angle by deflection of a monolithic flap such that the angular change of the trailing edge is uniform across the span of the vane.

SUMMARY OF THE INVENTION

In a featured embodiment, a gas turbine engine includes a fan section, a compressor section, and a turbine section. The fan section has a plurality of vane assemblies spaced circumferentially about an engine axis. The vane assemblies each include an airfoil extending between a leading edge and a trailing edge, a control rod extending through the airfoil, and a mechanism driven by the control rod to change the shape of the airfoil.

In another embodiment according to the previous embodiment, the mechanism changes the shape of the trailing edge.

In another embodiment according to any of the previous embodiments, the trailing edge includes a plurality of radial segments interspaced by deformable supports.

In another embodiment according to any of the previous embodiments, the radial segments are one of metal, carbon fiber, and ceramic. The deformable supports are one of polyurethane, isoprene, silicone, and fluoroelastomer.

In another embodiment according to any of the previous embodiments, the control rod drives the plurality of radial segments to pivot from an initial position to a morphed position in which the radial segments each have a different angle relative to the leading edge.

In another embodiment according to any of the previous embodiments, one of the control rod and the radial segments includes a plurality of protrusions and the other includes angled slots receiving the protrusions.

In another embodiment according to any of the previous embodiments, the control rod includes the plurality of protrusions and each radial segment includes an angled slot receiving a protrusion.

In another embodiment according to any of the previous embodiments, the control rod translates radially within the airfoil such that the protrusions slide within the angled slots driving the radial segments to pivot into the morphed position.

In another embodiment according to any of the previous embodiments, the vanes further include a flexible skin.

In another embodiment according to any of the previous embodiments, the flexible skin is comprised of one of ethylene propylene diene monomer, synthetic rubber, and thermoplastic polyurethane.

In another embodiment according to any of the previous embodiments, the airfoil includes a pressure side and a suction side. The flexible skin on the pressure side slides relative to the flexible skin on the suction side when the airfoil changes shape.

In another embodiment according to any of the previous embodiments, a single synchronization ring drives the control rod of each vane assembly to change the shape of each airfoil simultaneously.

In another embodiment according to any of the previous embodiments, a first and second synchronization ring drives control rods of a first and second subset of the plurality of vane assemblies respectively. The first and second synchronization rings drive the control rods to change the shape of the airfoils in the first and second subset independently.

In another embodiment according to any of the previous embodiments, the control rod of each of the plurality of vane assemblies is driven to rotate by a separate actuator to change the shape of each airfoil independently.

In another embodiment according to any of the previous embodiments, a controller controls actuation of the control rods. The controller actuates the control rods to change the shape of the airfoils in response to a change in operating conditions.

In another embodiment according to any of the previous embodiments, the controller controls actuation of at least one synchronization ring. The at least one synchronization ring drives the control rod of each of the vane assemblies and drives a flap portion of each airfoil to pivot about an airfoil axis.

In another embodiment according to any of the previous embodiments, the controller drives the plurality of vanes into a non-axisymmetric configuration in response to non-axisymmetric fan inlet conditions.

In another featured embodiment, a gas turbine engine includes a fan section, a compressor section, and a turbine section. The compressor section has a plurality of vane assemblies spaced circumferentially about an engine axis. The vane assemblies each include an airfoil extending between a leading edge and a trailing edge, a control rod extending through the airfoil, and a mechanism driven by the control rod to change the shape of the airfoil.

In another featured embodiment, a vane system for a gas turbine engine includes a plurality of vane assemblies spaced circumferentially about an engine axis. The vane assemblies each include an airfoil extending between a leading edge and a trailing edge. The trailing edge includes a plurality of radial segments interspaced by deformable supports, a control rod extending through the airfoil, and a mechanism driven by the control rod to change the shape of the trailing edge by driving the plurality of radial segments to pivot from an initial position to a morphed position in which the radial segments each have a different angle relative to the leading edge.

In another embodiment according to any of the previous embodiments, one of the control rod and the radial segments includes a plurality of protrusions and the other includes angled slots receiving the protrusions. The control rod translates radially within the airfoil such that the protrusions slide within the angled slots driving the radial segments into the morphed position.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
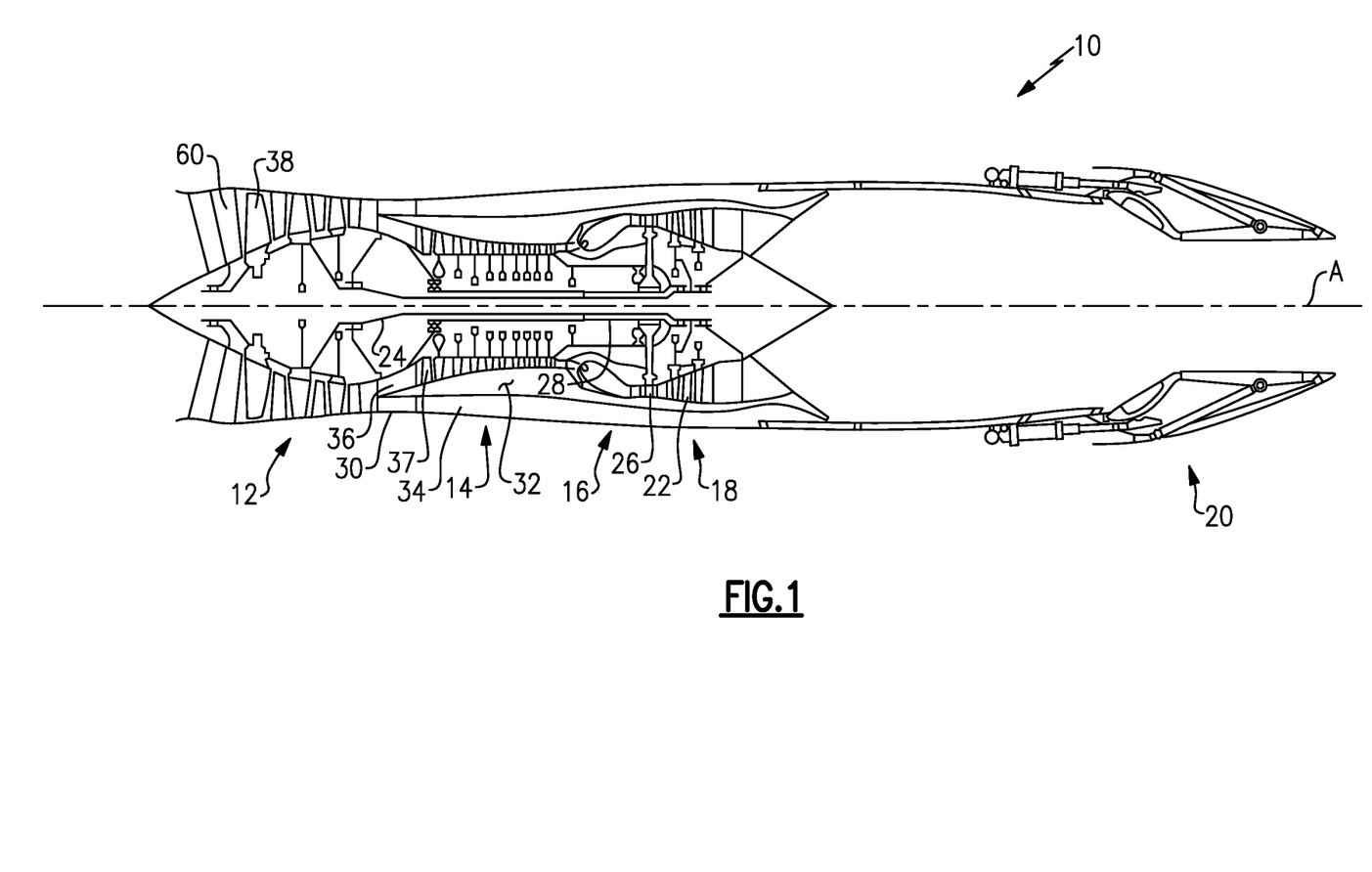
FIG. 1 schematically shows a gas turbine engine.

FIG. 1 schematically illustrates a gas turbine engine 10. The gas turbine engine 10 is disclosed herein as a two-spool turbofan that generally incorporates a fan section 12, a compressor section 14, a combustor section 16, a turbine section 18, and a nozzle section 20. The sections are defined along a central longitudinal engine axis A.

The compressor section 14, the combustor section 16, and the turbine section 18 are generally referred to as the engine core. The fan section 12 and a low pressure turbine 22 of the turbine section 18 are coupled by a first shaft 24 to define a low spool. The compressor section 14 and a high pressure turbine 26 of the turbine section 18 are coupled by a second shaft 28 to define a high spool.

An outer engine case structure 30 and an inner engine structure 32 define a generally annular secondary flow path 34 around an inner flow path 36. It should be understood that various structure within the gas turbine engine 10 may define the outer engine case structure 30 and the inner engine structure 32 which essentially define an exoskeleton to support the core engine therein.

Air which enters the fan section 12 is divided between an inner flow through the inner flow path 36 and a secondary or bypass flow through the secondary flow path 34. The inner flow passes through the compressor section 14, the combustor section 16, the turbine section 18, and then through the nozzle section 20. The secondary flow may be utilized for a multiple of purposes to include, for example, cooling and pressurization. The secondary flow as defined herein is any flow different from the primary combustion gas exhaust core flow. The secondary flow passes through an annulus defined by the outer engine case structure 30 and the inner engine structure 32 then may be at least partially injected into the core flow adjacent the nozzle section 20.

The gas turbine engine 10 further includes a vane system 60 upstream of a fan 38 of the fan section 12.

Figure 2:
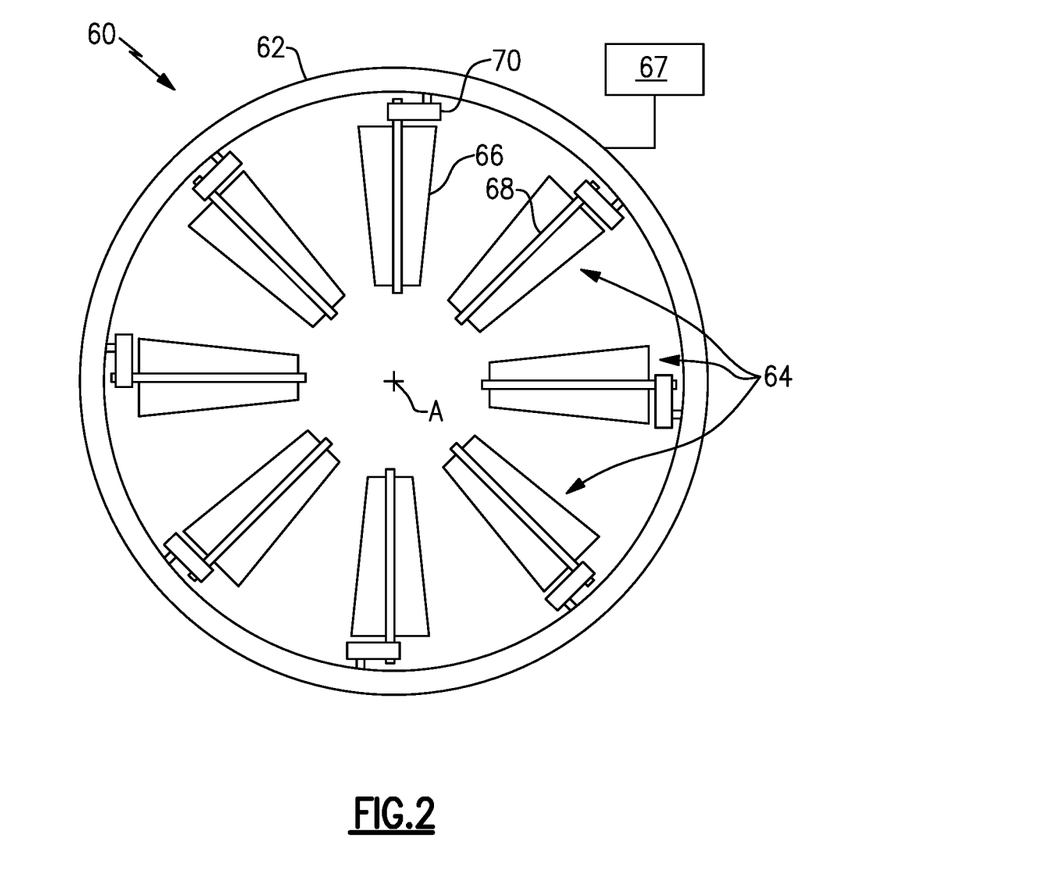
FIG. 2 illustrates a vane system from the engine.

FIG. 2 illustrates details of the vane system 60. Vane system 60 includes a synchronization ring 62 and a plurality of vane assemblies 64 arranged circumferentially about the engine central longitudinal axis A. Each vane assembly 64 includes an airfoil 66, a control rod 68 extending through the airfoil 66, and a bell-crank mechanism 70 driven by the synchronization ring 62. A controller 67 is configured to control actuation of the synchronization ring 62.

The operation of the synchronization ring 62 may be as known. This disclosure relates to the operation of the bell-crank mechanism 70 to change the shape of airfoil 66.

Figure 3:
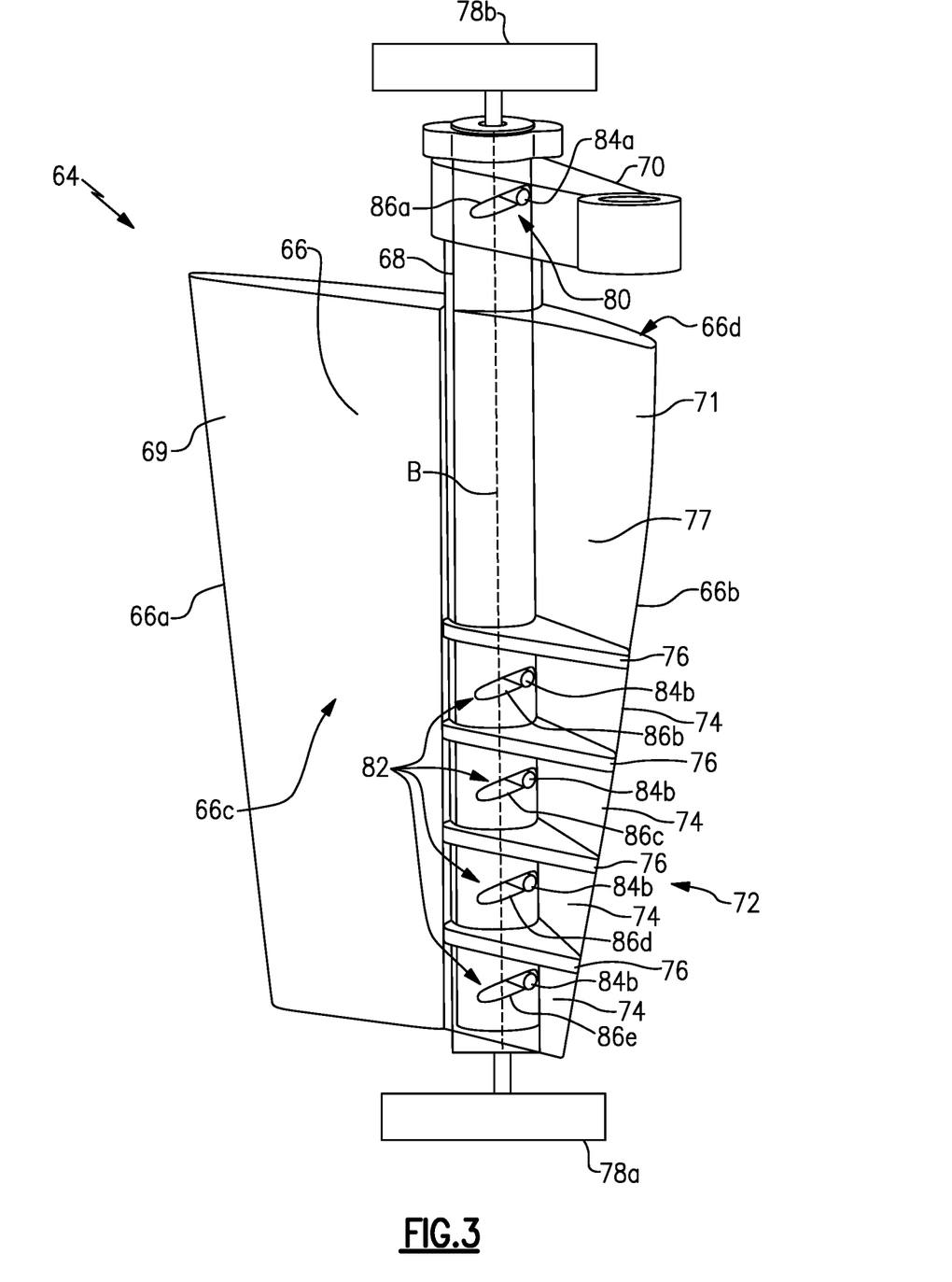
FIG. 3 illustrates details of a vane assembly from the vane system.

FIG. 3 illustrates an example of one of the vane assemblies 64. The airfoil 66 includes a leading edge 66a and a trailing edge 66b downstream of the leading edge 66a. In this example, a strut portion 69 of the airfoil 66 extends from the leading edge 66a to the control rod 68. A variable flap portion 71 of the airfoil 66 is aft of the strut portion 69 and extends from the control rod 68 to the trailing edge 66b. The variable flap portion 71 includes a morphable structure 72 defined by a plurality of radial segments 74 interspaced by deformable supports 76. The airfoil 66 further includes a pressure side 66c and a suction side 66d positioned opposite the pressure side 66c and a flexible skin 77 surrounding the pressure side 66c and suction side 66d.

The strut portion 69 and each radial segment 74 of the variable flap portion 71 in this example may be made of a rigid material such as metal, carbon fiber, or ceramic. The deformable supports 76 in this example are made of elastomer. Specifically, the deformable supports 76 may be polyurethane, isoprene, silicone, or fluoroelastomer.

The airfoil 66 extends from a radially inner support hardware 78a to a radially outer support hardware 78b. Radially inner support hardware 78a may be mounted on a hub (not shown) of the fan section 12. Radially outer support hardware 78b may be mounted on bypass duct housing 15 (not shown).

Terms such as "radial," "inner," and "outer" refer to locations and orientations with respect to the central engine axis A. Moreover, the terminology "first" and "second" used herein is to differentiate that there are two architecturally distinct components or features. It is to be further understood that the terms "first" and "second" are interchangeable in that a first component or feature could alternatively be termed as the second component or feature, and vice versa.

The radially inner and outer support hardware 78a/78b are configured to maintain the radial position of each vane assembly 64 within the fan section 12 while allowing the variable flap portion 71 of the airfoil 66 to pivot about an airfoil axis B. Activation of the synchronization ring 62 drives the bell-crank mechanism 70 of each vane assembly 64 to, in turn, cause the variable flap portion 71 of each vane assembly 64 to pivot about the airfoil axis B. In this example, the strut portion 69 remains fixed by support hardware 78a/78b when the bell-crank mechanism 70 actuates, and only the variable flap portion 71 pivots. In other examples, strut portion 69 is not fixed such that the entire airfoil 66 pivots about axis B when the bell-crank mechanism 70 actuates.

Control rod 68 is housed within airfoil 66 and is permitted to slide relative to the variable flap portion 71 in a radial direction about axis B. Control rod 68 is driven to radially translate through a control rod mechanism 80 driven by the rotating input of the bell-crank mechanism 70.

The morphable structure 72 also includes a morphing mechanism 82 driven by translation of the control rod 68 to change the shape of the trailing edge 66b. The radial segments 74 of the variable flap portion 71 are noncontinuous with one another and the strut portion 69, such that they may rotate or pivot independently about axis B. Morphing mechanism 82 converts the radial sliding movement of the control rod 68 into rotation or pivoting of the radial segments 74 about axis B relative to the leading edge 66a.

Control rod mechanism 80 and morphing mechanism 82 in this example are cam mechanisms. The control rod mechanism 80 includes a protrusion 84a on the control rod 68 and a slot 86a configured to receive the protrusion 84a in the bell-crank mechanism 70. Similarly, morphing mechanism 82 includes a plurality of protrusions 84b on the control rod 68 and each radial segment 74 includes a slot 86b/86c/86d/86e for receiving a protrusion 84b. The slots 86a/86b/86c/86d/86e are angled relative to the plane tangential to axis B. In operation, when the bell-crank mechanism 70 actuates, the angled slot 86a of control rod mechanism 80 moves circumferentially about the control rod 68 and applies a radial force on protrusion 84a which slides within slot 86a and drives control rod 68 to translate along axis B. This translation of the control rod 68 translates the protrusions 84b which, in turn, slide within angled slots 86b/86c/86d/86e and apply a force to angled slots 86b/86c/86d/86e which drives the radial segments 74 to rotate about axis B. While the protrusions 84a/84b are disclosed on the control rod 68 and the slots 86a/86b/86c/86d/86e are disclosed on the bell-crank mechanism 70 and radial segments 74, slot(s) 86a/86b/86c/86d/86e could be located on the control rod 68 with protrusions 84a/84b located on the bell-crank mechanism 70 and/or the radial segments 74.

Morphing mechanism 82 is tailorable with respect to each radial segment 74, such that for a given degree of rotational input from the bell-crank mechanism 70, each radial segment 74 can pivot by a different desired amount about axis B to tailor the shape of the trailing edge 66b. This may be accomplished by adjusting the angles of slots 86a/86b/86c/86d/86e relative to the plane tangent to axis B. Each of the angled slots 86b/86c/86d/86e are indicated as distinct components to make clear that each slot may have a different angle.

The deformable supports 76 interspace and connect the radial segments 74, and are deformable such that radial segments 74 maintain a connection as they pivot about axis B. The deformable supports 76 and the flexible skin 77 provide the airfoil with a smooth external body around the pressure side 66c and suction side 66d. In this example, the flexible skin 77 surrounds both the strut portion 69 and the variable flap portion 71 of the airfoil 66, which includes surrounding the morphable structure 72. In other examples, the flexible skin 77 may only surround the variable flap portion 71.

Figure 4A:
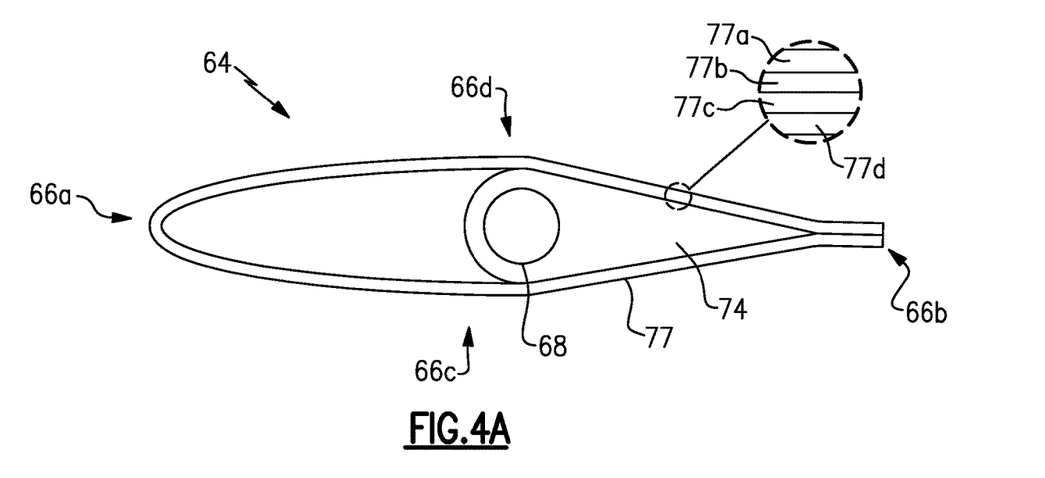
FIG. 4A illustrates a top view of the vane assembly in an initial position.

FIG. 4A illustrates a top view of vane assembly 64 where the radial segments 74 are in an initial aligned position. In this aligned position, the radial segments 74 are generally stacked directly atop one another and the deformable supports 76 interspacing the radial segments 74 are not deformed.

FIG. 4A further illustrates that the flexible skin 77 may be formed of layers 77a/77b/77c/77d of alternating elastomer and a relatively stiffer material, such as metal or polymer matrix composite. The introduction of elastomer layers within a composite or metal structure of the flexible skin 77 allows it to change to the desired shape of the airfoil 66 while still retaining stiffness to support pressure loads on the airfoil during operation. The elastomer layers 77a and 77c may be one of ethylene propylene diene monomer, synthetic rubber, and thermoplastic polyurethane, and may be thinner relative to the rigid layers 77c and 77d. Alternatively, the complete flexible skin 77 may be uniform without layers, and may be formed of one of the above listed elastomers or an appropriately flexible metal, such as titanium.

FIG. 4A also illustrates that the flexible skin 77 may be discontinuous between the pressure side 66c and the suction side 66d at the trailing edge 66b. This configuration allows flexible skin 77 on the pressure side 66c to slide relative to the suction side 66d when the trailing edge 66b changes shape. Allowing the flexible skin 77 to slide at the trailing edge 66b enables use of less flexible, but more robust, materials for the flexible skin 77, such as titanium. Alternatively, the flexible skin 77 can be continuous at both the leading edge 66a and trailing edge 66b and fully encapsulate the airfoil 66.

Figure 4B:
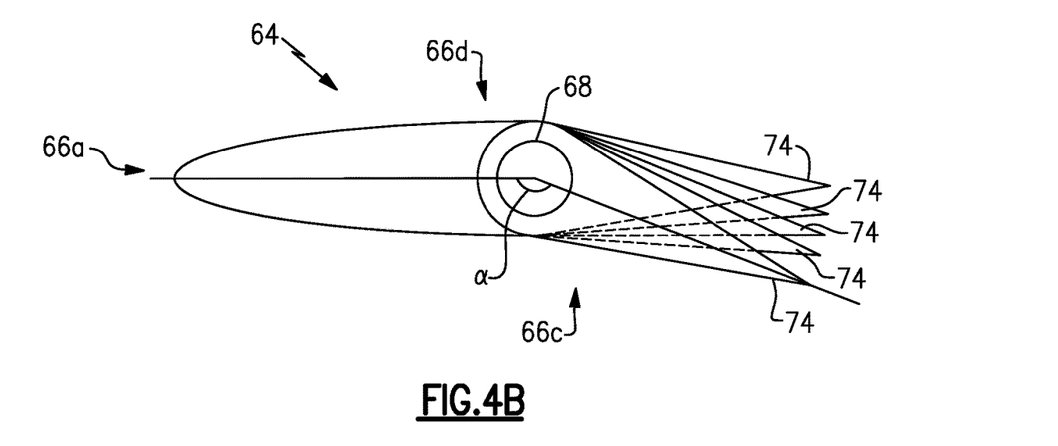
FIG. 4B illustrates a top view of the vane assembly in a morphed position.

FIG. 4B illustrates a top view of vane assembly 64 (without deformable supports 76 or flexible skin 77 as shown) where the radial segments 74 have been driven into a morphed position. In this morphed position, each radial segment 74 has a different angle $\alpha$ relative to the leading edge 66a and the deformable supports 76 deform to bridge the angular gap and maintain connection between each radial segment 74. In changing shape from the aligned position illustrated in FIG. 4A to the morphed position in FIG. 4B, the radial segments 74 are pivoted towards the pressure side 66c of the airfoil 66. However, the radial segments 74 may also be driven into an alternate morphed position where the radial segments 74 are pivoted towards the suction side 66d of the airfoil 66.

To better illustrate the concept, the amount of difference between the angles $\alpha$ of each radial segment 74 may be illustrated to be greater than will be the actual case. Similarly, although the difference in angle $\alpha$ between each adjacent radial segments 74 is illustrated as approximately equal across the span, that may not be the case in practice.

Referring back to FIG. 4A, the airfoil 66 is illustrated as a symmetrical airfoil in the aligned position, i.e. one in which the airfoil 66 extends straight down from the top view without variations along its span. However, there may be some camber or tailoring of the shape of the airfoil across its span in the aligned position and a deformed position that radial segments 74 are driven into may have less camber than the aligned position.

Accordingly, activation of the bell-crank mechanism 70 effectuates both rotation of variable flap 71 about axis B and also changes the shape of the trailing edge 66b. Use of a single input beneficially reduces the number of components needed to accomplish the desired motion and shape change.

Further, the configuration of vane assembly 64 allows an additional degree of freedom in tailoring both the orientation of variable flap 71 about axis B and tailoring of the shape of the variable flap 71 in the radial direction. This allows changing between more optimal shapes and orientation of airfoil 66 during operation for different operating conditions of the engine 10. This allows better conditioning of the air ingested by the fan during those operating conditions, leading to higher efficiency and/or improved stability.

In the example vane system 60 disclosed in FIGS. 2-4, activation of the synchronization ring 62 by controller 67 drives the bell-crank mechanisms 70 of each of the plurality of vane assemblies 64 in unison. Thus, activation of the synchronization ring 62 causes each variable flap 71 to pivot about axis B and have its morphable structure 72 change shape axisymmetrically.

The controller 67 may be an independent, stand-alone component, or part of a flight full authority digital engine controller (FADEC). The controller 67 is configured to actuate the synchronization ring 62 to pivot and morph variable flaps 71 in response to change in operating conditions of the engine 10. In this example, the controller 67 controls the synchronization ring to keep the variable flap portion 71 in the initial position illustrated in FIG. 4A during cruise condition and the morphed position illustrated in FIG.

4B may be utilized during idle or dash condition. The controller 67 may also activate the synchronization ring into intermediate positions between an initial and a fully morphed position during certain operating conditions, such as during idle or dash. Additionally, controller 67 may utilize a morphed position in the direction of one of the pressure side 66c or suction side 66d during certain operating conditions, such as idle, and utilize an alternate morphed position in the opposite direction during other operating conditions, such as dash.

Figure 5:
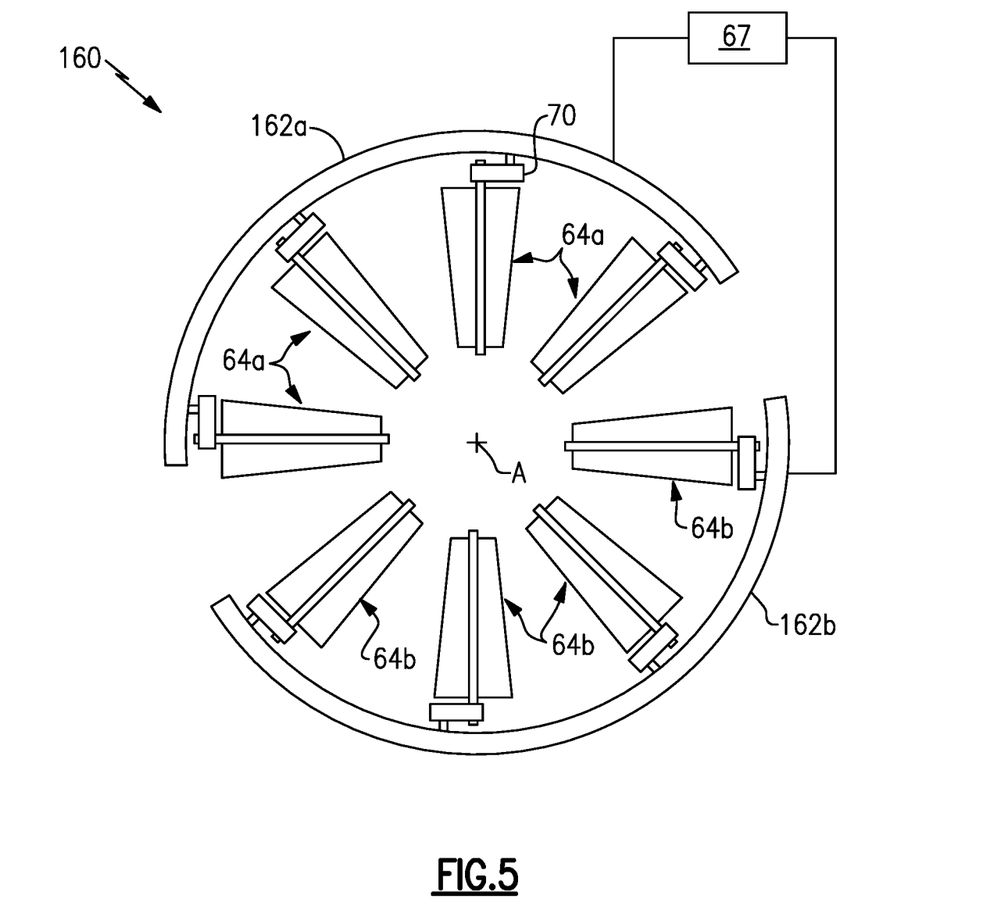
FIG. 5 illustrates another example vane system with a plurality of synchronization rings.

FIG. 5 illustrates another example vane system 160. In this disclosure, like reference numerals designate like elements where appropriate and reference numerals with the addition of one-hundred or multiples thereof designate modified elements that are understood to incorporate the same features and benefits of the corresponding elements.

In the vane system 160, there is a first synchronization ring 162a and a second synchronization ring 162b. The first and second synchronization rings 162a/162b each drive the bell-crank mechanisms 70 of a first and second group of vane assemblies 64a/64b respectively. The controller 67 is configured to control actuation of the first and second synchronization rings 162a/162b independently. Thus, the controller 67 can direct the first group of vane assemblies 64a to pivot and morph shape independently of the second group of vane assemblies 64b, and vice versa. Although two synchronization rings 162a/162b controlling two groups of vane assemblies 64a/64b are shown, one would understand that there could be additional synchronization rings controlling further subsets of vane assemblies.

Figure 6:
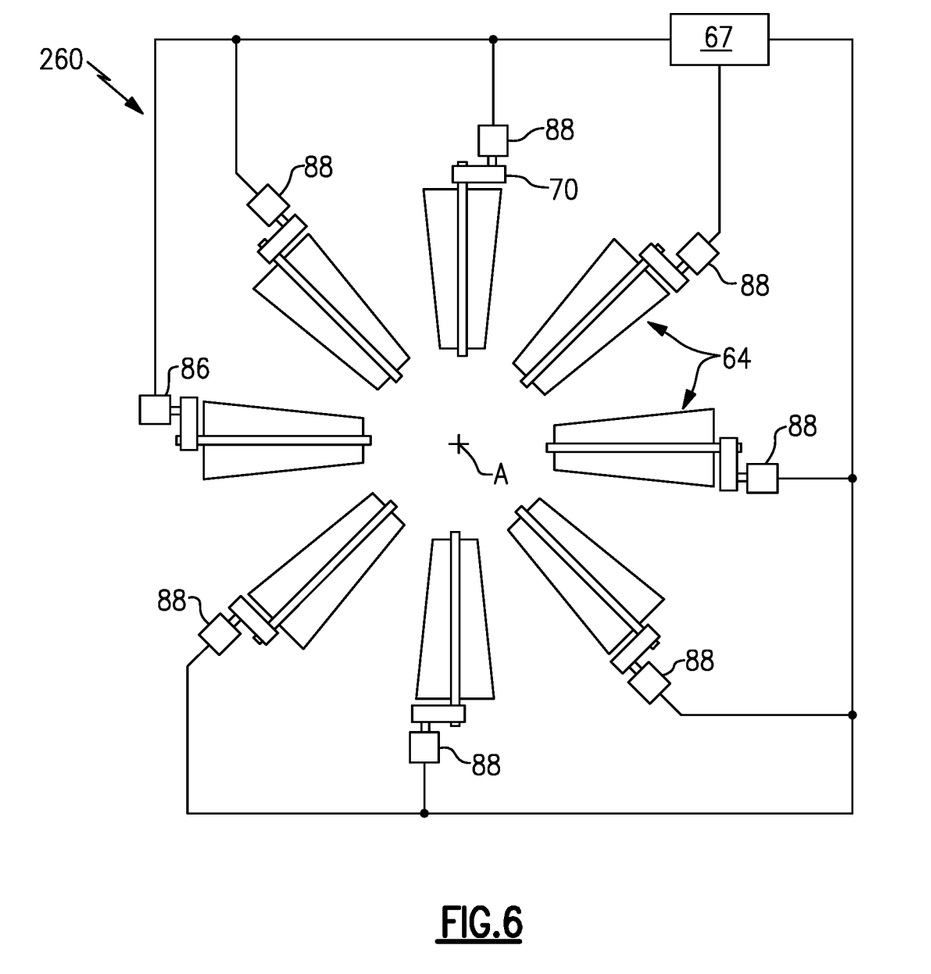
FIG. 6 illustrates another example vane system with independent actuators.

FIG. 6 illustrates another example vane system 260. In the vane system 260, each bell-crank mechanism 70 of a plurality of vane assemblies 64 is driven by a separate actuator 88 which is controlled by controller 67. Thus, controller 67 can control each actuator 88 to drive each vane assembly 64 to pivot and change shape independent of every other vane assembly 64.

The vane systems 160 and 260 illustrated in FIGS. 5 and 6 allow the vane assemblies 64 to be driven from axisymmetric configurations into non-axisymmetric configurations. This is accomplished by driving individual or subgroups of vane assemblies 64 about the circumference of the vane systems 160/260 non-uniformly or at different schedules. The controller 67 may drive the vane systems 160/260 into non-axisymmetric configurations in response to non-axisymmetric fan inlet conditions, i.e. where air ingested by the fan section 12 is circumferentially non-uniform. These non-axisymmetric fan inlet conditions may be caused by the shape of the inlet delivering flow to the fan 38. Different inlet configurations introduce different non-axisymmetric distortion to the face of the fan 38 which may also vary between operating conditions of the engine 10. Accordingly, the non-axisymmetric control offered by vane systems 160/260 allow circumferential tailoring of the vanes to address this varying distortion between operating conditions.

Although embodiments of this disclosure have been shown, a worker of ordinary skill in this art would recognize that modifications would come within the scope of this disclosure. For example, although the vane system 60 is shown and described with reference to one location in the fan section 12 of engine 10, it is to be understood that the examples herein are also applicable to structural vanes in other locations in fan section 12 and other sections of the engine 10, such as in vanes 37 of the compressor section 14. This disclosure is also beneficial in other engine configurations, including high-bypass turbofan engines. Further, although the morphable structure 72 is defined in this example with reference to the trailing edge 66b, one would understand that such a configuration could also be beneficially applied to the leading edge 66a of the airfoil 66. For that reason, the following claims should be studied to determine the true scope and content of this disclosure.

What is claimed is:

1. A vane system for a gas turbine engine comprising:
a plurality of vane assemblies spaced circumferentially about an engine axis, the vane assemblies each including:
an airfoil extending between a leading edge and a trailing edge, the trailing edge comprising a plurality of radial segments interspaced by deformable supports, and
a control rod extending through the airfoil and driving the plurality of radial segments to change the shape of the trailing edge; and
wherein one of the control rod and the radial segments include a plurality of protrusions and the other includes angled slots receiving the protrusions.

2. A gas turbine engine comprising:
a fan section, a compressor section, and a turbine section;
a plurality of vane assemblies spaced circumferentially about an engine axis, the vane assemblies each including:
an airfoil extending between a leading edge and a trailing edge, wherein the trailing edge comprises a plurality of radial segments interspaced by deformable supports, and
a control rod extending through the airfoil and driving the radial segments to change the shape of the trailing edge; and
wherein the radial segments are one of metal, carbon fiber, and ceramic, and the deformable supports are formed of an elastomeric material comprising at least one of polyurethane, isoprene, silicone, and fluroelastomer.

3. The gas turbine engine of claim 2, wherein the control rod drives the plurality of radial segments to pivot from an initial position to a morphed position in which the radial segments each have a different angle relative to the leading edge.

4. The gas turbine engine of claim 3, wherein one of the control rod and the radial segments includes a plurality of protrusions and the other includes angled slots receiving the protrusions.

5. The gas turbine engine of claim 4, wherein the control rod includes the plurality of protrusions and each radial segment includes an angled slot receiving a protrusion.

6. The gas turbine engine of claim 4, wherein the control rod translates radially within the airfoil such that the protrusions slide within the angled slots driving the radial segments to pivot into the morphed position.

7. The gas turbine engine of claim 2, wherein the airfoil includes a pressure side and a suction side, and a flexible skin surrounds the pressure side and suction side.

8. The gas turbine engine of claim 7, wherein the flexible skin is comprised of one of ethylene propylene diene monomer, synthetic rubber, and thermoplastic polyurethane.

9. The gas turbine engine of claim 7, wherein the flexible skin on the pressure side slides relative to the flexible skin on the suction side when the airfoil changes shape.

10. The gas turbine engine of claim 2, further including a single synchronization ring that drives the control rod of each vane assembly to change the shape of each airfoil simultaneously.

11. The gas turbine engine of claim 2, further comprising a first and second synchronization ring driving control rods of a first and second subset of the plurality of vane assemblies respectively, wherein the first and second synchronization rings drive the control rods to change the shape of the airfoils in the first and second subset independently.

12. The gas turbine engine of claim 2, wherein the control rod of each of the plurality of vane assemblies is driven by a separate actuator to change the shape of each airfoil independently.

13. The gas turbine engine of claim 2, further comprising a controller controlling actuation of the control rods, the controller actuating the control rods to change the shape of the airfoils in response to a change in operating conditions.

14. The gas turbine engine of claim 13, wherein the controller controls actuation of at least one synchronization ring, the at least one synchronization ring driving the control rod of each of the vane assemblies and driving a flap portion of each airfoil to pivot about an airfoil axis.

15. The gas turbine engine of claim 13, wherein the controller drives the plurality of vane assemblies into a non-axisymmetric configuration in response to non-axisymmetric fan inlet conditions.

16. The gas turbine engine of claim 2, wherein the vane assemblies further include a bell-crank mechanism driving a flap portion of the airfoil to pivot about an airfoil axis and driving the control rod to change the shape of the trailing edge.

17. The gas turbine engine of claim 2, wherein the plurality of vane assemblies are located in the fan section.

18. The gas turbine engine of claim 2, wherein the plurality of vane assemblies are located in the compressor section.

19. A vane system for a gas turbine engine comprising:
a plurality of vane assemblies spaced circumferentially about an engine axis, the vane assemblies each including:
an airfoil extending between a leading edge and a trailing edge, the trailing edge comprising a plurality of radial segments interspaced by deformable supports, and
a control rod extending through the airfoil and driving the plurality of radial segments to pivot from an initial position to a morphed position in which the radial segments each have a different angle relative to the leading edge; and
wherein the radial segments are one of metal, carbon fiber, and ceramic, and the deformable supports are formed of an elastomeric material comprising at least one of polyurethane, isoprene, silicone, and fluroelastomer.

20. The vane system of claim 19, wherein one of the control rod and the radial segments includes a plurality of protrusions and the other includes angled slots receiving the protrusions, and the control rod translates radially within the airfoil such that the protrusions slide within the angled slots driving the radial segments into the morphed position.

* * * * *